United States Patent

McWhorter

[15] 3,686,972
[45] Aug. 29, 1972

[54] INTERNAL COMBUSTION ENGINE VARIABLE THROW CRANKSHAFT

[72] Inventor: Edward M. McWhorter, 6931 Greenbrook Circle, Citrus Heights, Calif. 95610

[22] Filed: May 28, 1970

[21] Appl. No.: 41,298

[52] U.S. Cl. ............... 74/602, 123/48 B, 123/78 E, 123/78 F, 123/197 AC, 74/393
[51] Int. Cl. ............................................. F16h 21/30
[58] Field of Search..74/602, 601; 123/197 AC, 78 E, 123/78 F, 48 B

[56] References Cited

UNITED STATES PATENTS

| 854,466 | 5/1907 | Cole | 123/78 F X |
| 2,199,625 | 5/1940 | Fiala-Fernbrugg | 123/78 F X |
| 2,369,747 | 2/1945 | Munn | 74/602 X |

OTHER PUBLICATIONS

U.S. Dept. of Commerce, General Information Concerning Patents.

Primary Examiner—William F. O'Dea
Assistant Examiner—F. D. Shoemaker

[57] ABSTRACT

A crankshaft for an internal combustion engine comprising a plurality of crank throws whose crank radii are made to vary throughout the crankshaft revolution. The crankshaft and varying radii crank throws are interconnected by four gears which rotate an eccentric which is placed between the connecting rod and crankpin. Rotation of the eccentric may be clockwise or counterclockwise depending on the arrangement of gears used to generate either epicycloidal or hypocycloidal motion in which the cuspated motion is attenuated by incorporating a pair of non-circular gears which also rotate the eccentric upon the crankpin in a manner which causes the piston to move in the cylinder to a precalculated position during the combustion independent of the uniform speed of the crankpin.

2 Claims, 2 Drawing Figures

INVENTOR.
EDWARD M. MC WHORTER

INVENTOR.
EDWARD M. MC WHORTER

INTERNAL COMBUSTION ENGINE VARIABLE THROW CRANKSHAFT

BACKGROUND OF THE INVENTION

1. Field of Invention

This invention relates to the field of crank mechanisms and in particular to their use in the piston driven internal combustion engine.

2. Prior Art

In general the amount of crank torque generated by any reciprocating piston driven internal combustion engine is proportional to the magnitude of the tangential force vector acting on the crank radius and is in essence simply the rotative effort applied to the crankpin. This rotative effort is equal to the system net effort which is acting on the piston in the direction of the piston axial centerline and resolved into a force acting along the length of the connecting rod and the normal force acting on the piston wrist pin. At the crankpin, the force acting along the connecting rod is resolved into radial and tangential force components. This latter force acting over the length of the crank radius produces the torque delivered by the crankshaft. I have discovered that the efficiency of this type of system can be greatly increased by causing the crank radius to vary in length in a cycloidal manner synchronized to the rotation of the crankpin in a more effective manner.

The properties of cycloidal crank mechanisms are well defined in the literature under the general heading of kimematics. It should be pointed out with certainty that the invention presented in this disclosure is not a true cycloidal crank as those defined in the literature since the crankpin axial center line subscribes a circular path about the main crank journal which itself remains stationary relative to its rotative center. The cycloidal motion imparted to the connecting rod at the crank end is caused by placing an intervening cam between the crank pin and the connecting rod bearing. This cam mechanism may be made to rotate about the crankpin axial center line by any convenient manner which will produce a predictable crank and rod position corresponding to any position of the piston during the operating cycle of the engine.

SUMMARY OF THE INVENTION

The invention is a crankshaft to be used in the internal combustion engine. The crankshaft comprises a plurality of cycloidal 2 gear systems in which the stationary gear of each system is fixedly positioned over the centroid of revolution of the crankshaft having a plurality of crank throws. The moving or running gear of each cycloidal gear system is fixedly attached to a shaft which is rotatably mounted in one of the pair of crank arms comprising each crank throw. To the other end of the shaft is a fixedly attached non-circular gear. The non-circular gear is enmeshed with its duplicate or conjugate non-circular gear which is fixedly attached to an eccentric which is rotatably mounted between the piston connecting rod and the crankpin of each crankthrow. Revolution of the crankshaft induces a rotation of the running cycloidal gear which is enmeshed in the stationary gear and transmits this rotation through the connecting shaft to the non-circular gear which is enmeshed and rotates its duplicate or conjugate non-circular gear attached to the eccentric. Rotation of the eccentric is not uniform relative to the revolution of the crankshaft and is not intended to be circumstantial within the limits of the mechanical boundary of the system. Instead, conditions more favorable to the combustion are defined and the piston position is precalculated for these conditions and approximated by designing the ratio of diameters of the non-circular gears to generate a movement of the eccentric approximating the precalculated piston position using rotational input from the cycloidal running gear. The general effect is to shape the mechanical boundaries of piston displacement in accordance with combustion requirements independent of the circumstantial conditions of pure mechanical movement. The synergism of circular cycloidal and non-circular gear motion imparted to components within the system has as its basis of operation the effect of varying the otherwise uniform rotation of the eccentric and uniform speed of the crankpin by periodically increasing and decreasing the throw of the crankshaft in accordance with the combustion requirements of the particular engine system.

As an example of how this system would operate let us first consider the Diesel cycle. The fuel injection rate of a Diesel engine is limited by the crank rise rate (R.R.) which effects piston speed, and by the extreme rise of pressure (ERP). As a general engineering rule of thumb the rise rate (RR) multiplied by the extreme rise in pressure (ERP) divided by 10,000 should be 2 or less to prevent combustion knocking.

Eq. (1) $ERP \times RR \times 10^{-4} = 2$ or less for good engine operation.

Where: ERP = Peak pressure − compression pressure

RR = ERP/degrees of crank rotation

In the standard Diesel engine the piston moves at varying speed while the crankpin revolves at uniform speed. The placement of the eccentric between the piston connecting rod and crankpin of such a system and the rotation of said eccentric imparts a second source of motion to the piston which augments or subtracts from that motion imparted by the crankpin. The extreme pressure rise (ERP) can therefore be partially controlled by the motion imparted to the piston by the rotation of said eccentric during the period of fuel injection. When the initial downward motion of the piston is accelerated by the rotation of the said eccentric the fuel injection can be completed earlier during the power stroke since the increased combustion volume can more readily accommodate the extreme pressure rise (ERP) within the acceptable limits as designated by Equation (1) above. Because of the limiting factor of the extreme pressure rise (ERP) on the injection rate, the tendency of most Deisel equipment operators is to extend the period of fuel injection in order to obtain the required power output from their equipment. This practice results in the decrease in residence time of the burning fuel mixture last injected into the combustion chamber which increases the rate of unburned hydrocarbons in the exhaust emissions. The present invention makes such a practice unnecessary since the rate of fuel injection can be increased allowing an earlier fuel cut off during the power stroke.

The present invention may also be beneficially employed within the Otto cycle principle. Considering an electrical spark ignition of a normally aspirated gasoline and air charge it can be shown that the rotation of said eccentric will allow the combustion reaction to proceed at uniformly higher system pressure and density which tend to push the reaction upward along the Hugoniot curve within the weak detonation range. This is accomplished by decreasing the initial downward motion of the piston by the upward rotation of the eccentric thus producing higher effective combustion pressures for a corresponding greater effective crank angle. Operation of the system in this manner provides a more complete early combustion thus assuring a decrease in the percent of emission of unburned hydrocarbons in the exhaust stream. The improved performance as indicated by the higher combustion pressures for a greater effective crank angle may be traded off against a decrease in fuel to air mixture ratio and lower octane fuels to achieve a lower combustion temperature with a corresponding decrease in the generation of nitrogen oxides and the use of lead additives which are also undesirable products of the exhaust emission.

It is therefore the object of the present invention to provide in a manner hereinafter set forth a crankshaft of the aforementioned character comprising a means of controlling piston speed within some measure relative to the uniform speed of the crankpin allowing combustion to proceed in a manner which will be beneficial in the reduction of harmful exhaust emissions.

It is another object of the present invention to provide a variability within the crankshaft system described to allow its use in engines which operate on the Diesel cycle principle or on the Otto cycle principle without loss of thermodynamic efficiency within either system.

It is yet another object of the present invention to provide a means of decreasing the size of the associated gear train components by a unique method of constructing the crank arms.

Various other possible objects and advantages of the present invention will become apparent to those skilled in the art from the description to follow which discusses in detail the particular preferred embodiments and should not be taken as limiting the true scope of the invention as set forth in the appended claims.

BRIEF DESCRIPTION OF THE DRAWING

There are included as part of the specification drawings illustrative of the invention and briefly described as follows.

DESCRIPTION OF THE PREFERRED EMBODIMENT

Figure 1:
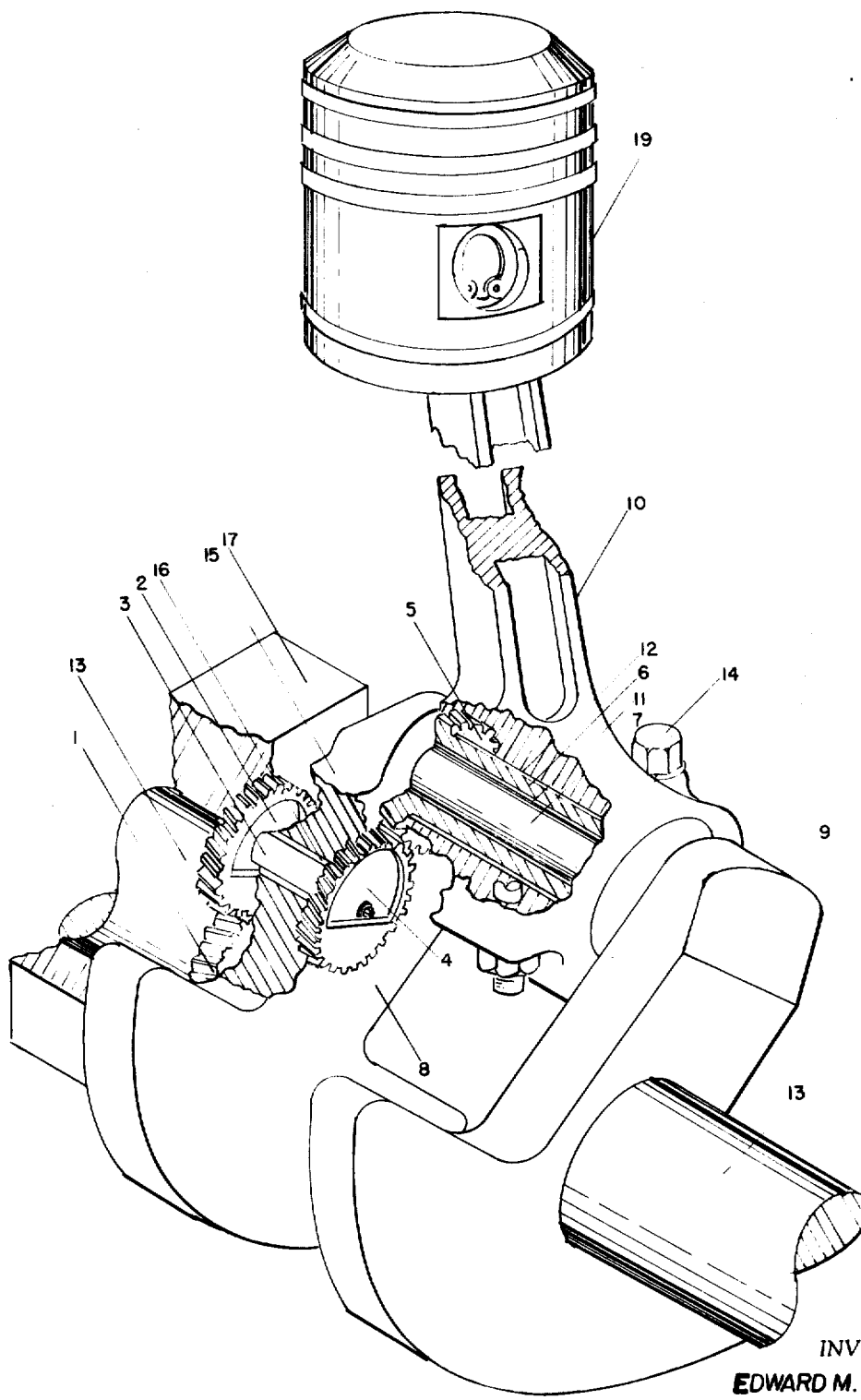
FIG. 1 is a perspective view of a section of a crank mechanism having a plurality of such sections and showing in cut-away the generation of epicycloidal motion and the reversal and transmittal of said motion to a rotating eccentric mechanism placed upon the crank pin.
Figure 2:
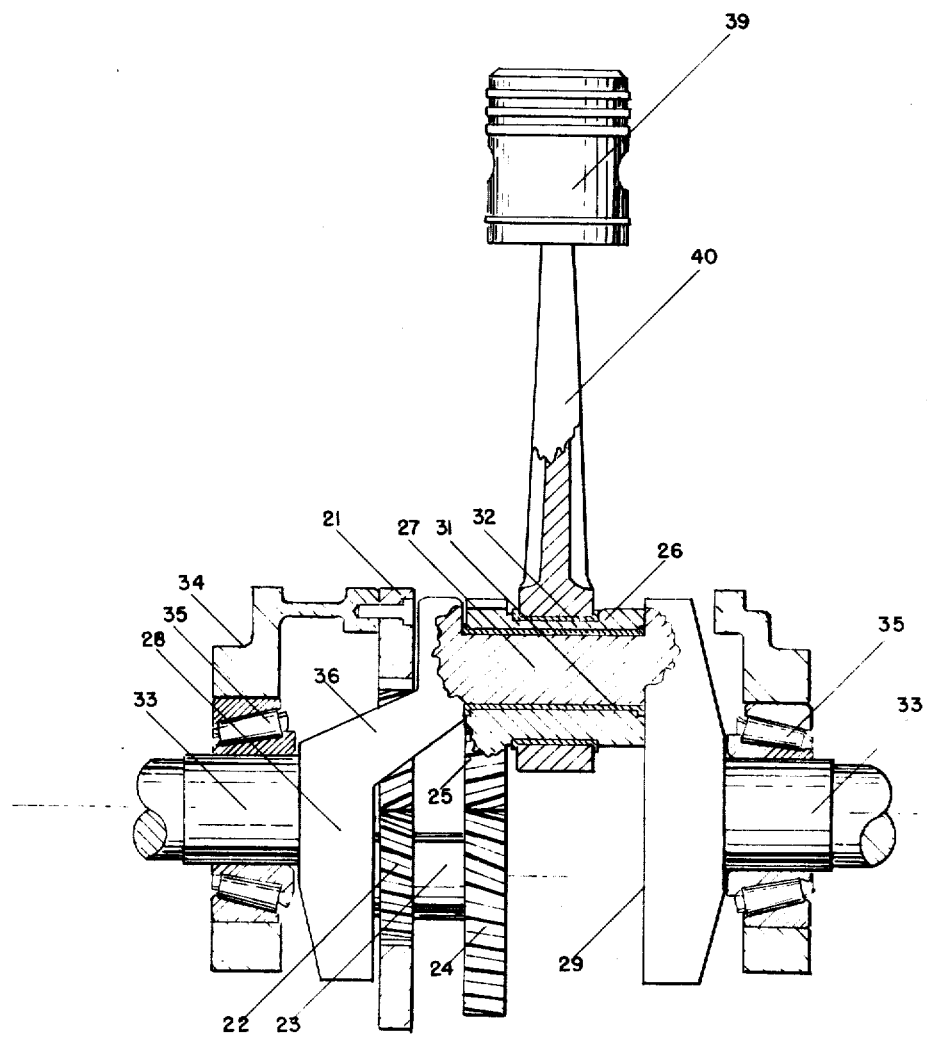
FIG. 2 is a section view of a crank mechanism showing the generation of a hypocycloidal motion and the reversal and transmittal of said motion to a rotating eccentric mechanism placed upon the crankpin.

Considering first the mechanical operation of the system herein described and referring to FIG. 1. Gear 1 is centrally positioned over shaft 13 and firmly affixed to the engine block 17. Shaft 13 is axially aligned with a plurality of equally spaced similar shafts constituting the main bearing shafts of a single or multiple throw crankshaft which is journaled in the engine block 17. Arms 8 and 9 are fixedly attached to their respective adjacent shaft 13. Pin 7 is fixedly attached to arms 8 and 9 providing a solid link for transmitting a unison of motion to arms 8 and 9 as they revolve with shaft 13. Gear 2 is fixedly attached to one end of shaft 3 which is rotatably mounted in arm 8. Non-circular gear 4 is fixedly attached to the other end of shaft 3. Non-circular gear 5 is fixedly attached to eccentric 6. Non-circular gear 5 and eccentric 6 are rotatably mounted on pin 7. Gear 2 is enmeshed with gear 1 and is caused to rotate when arms 8 and 9 revolve clockwise with shaft 13. The rotary motion induced in gear 2 is transmitted to non-circular gear 4 by connecting shaft 3. Non-circular gear 4 is enmeshed with its mating duplicate non-circular gear 5 causing non-circular gear 5 to rotate in a counter clockwise direction or opposite to the clockwise direction of the shaft 13. When the crown of the eccentric 6 is pointed downward and the piston 19 is at top center position the counter clockwise rotation of eccentric 6 which is affixed to non-circular gear 5 increases the initial downward travel of the piston making such a system suitable for operation of the Diesel cycle principle for those reasons previously set forth. Split sleeve bearings 11 and 12 fit on the inside and outside surfaces of eccentric 6 respectively. Bolt 14 secures the bearing cap to connecting rod 10. Extension 15 is a protrusion on arm 8 which accommodates sleeve bearing 16 and shaft 3. The position of extension 15 on arm 8 is determined by the relative size of gears 1 and 2. Referring to FIG. 2 gear 21 is an internally toothed gear which is centrally positioned over shaft 33 and firmly affixed to engine block 34 so as to be stationary relative to the revolution of shaft 33. Shaft 33 is axially aligned with a plurality of equally spaced similar shafts constituting the main bearing shafts of a single or multiple throw crank shaft which is journaled in main bearings 35 in the engine block 34. Arms 28 and 29 are fixedly attached to their respective adjacent shaft 33. Pin 27 is fixedly attached to arms 28 and 29 providing a solid link for transmitting a unison of motion to arms 28 and 29 as they revolve with shaft 33. Gear 22 is rotatably mounted on arm 28 and fixedly attached to one end of shaft 23. Non-circular gear 24 is fixedly attached to the other end of shaft 23. Non-circular gear 25 is fixedly attached to eccentric 26. Non-circular gear 25 and eccentric 26 are rotatably mounted on pin 27. Gear 22 is enmeshed in gear 21 and is caused to rotate when arms 28 and 29 revolve with shaft 33 in a clockwise direction. The rotary motion induced in gear 22 is transmitted to non-circular gear 24 by connecting shaft 23. Non-circular gear 24 is enmeshed with its matching duplicate non-circular gear 25 causing non-circular gear 25 to rotate in the same clockwise direction as shaft 33. When the crown of eccentric 26 is pointed downward when the piston 39 is at top center position the clockwise rotation of eccentric 26 which is affixed to non-circular gear 25 decreases the initial downward travel of the piston 39 making such a system suitable for operation on the Otto cycle principle for those reasons previously set forth. Split sleeve bearings 31 and 32 fit on the inside and outside surfaces of eccentric 26 respectively. Arm 28 contains an instep section 36 which allows the significant reduction in diameter of gear 21 and the consequent reduction in size of all other gears within the system. Connecting rod 40 is rotatably mounted on sleeve bearing 32 at one end and connected to piston 39 at the other end.

The cycloidal motion imparted to the connecting rod by the rotation of the crankpin cam mechanism about the crank greatly increases the torque of the engine at certain periods of the power stroke. In order to facilitate the demonstration of this fact the following standard system dimensions and operating conditions will be maintained throughout the discussion.

System Dimensions
    Piston diameter      4.00 inches
    Connecting rod length      9.60 inches
    Normal crank radius      2.40 inches
    Crank cam eccentricity      0.50 inches System Operating Conditions
    Compression ratio      7.5
    Augmentation factor      20.8%
    Combustion temperature      5000°R
    Combustion Pressure      957 psia
    Specific heat ratio      1.3

Three assumptions are made concerning the calculations used in this discussion, but are not to be taken in any manner as imposing limitations on the present invention.

1. The number of revolutions of the crankpin cam mechanism about the crankpin for each complete revolution of the crankshaft shall be in the same ratio as the diameter of the stationary gear to the diameter of the gear attached to the cam mechanism.

2. The top of the cam of the crankpin cam mechanism will be pointed in the downward attitude so as to present the shortest possible crank radius when the connecting rod is centered directly on the piston axial centerline.

3. Expansion of the combustion gases above the piston shall be isentropic.

The crank radius for the hypocycloidal augmented systems is given by the expression:

$$Rt = Rc \pm \left\{ \left[ (a-b)\cos\theta + b\cos\left[(a-b)\frac{\theta}{b}\right] \right]^2 + \left[ (a-b)\sin\theta - b\sin\left[(a-b)\frac{\theta}{b}\right] \right]^2 \right\}^{1/2} - Rc\left(\frac{Ra}{a}\right)$$

Equation 1

The crank radius for the epicycloidal augmented systems is given by the expression:

$$Rt = Rc \pm \left\{ \left[ (a+b)\cos\theta - b\cos\left[(a+b)\frac{\theta}{b}\right] \right]^2 + \left[ (a+b)\sin\theta - b\sin\left[(a+b)\frac{\theta}{b}\right] \right]^2 \right\}^{1/2} - Rc\left(\frac{Ra}{a}\right)$$

Equation 2 where:
Rt = Augmented crank radius
Rc = normal crank radius (2.4 inches)
Ra = Cam eccentricity (0.5 inches)
a = Stationary gear diameter
b = Crankpin cam mechanism gear diameter
θ = Crank station angle.

The crank radius for the various crank angle stations for a power stroke from 0° to 180° for the nodal systems, $n$, $2n$, and $3n$ for the hypocycloidal and epicycloidal rotational systems, abbreviated as H and E respectively, is presented in Table 1 below.

TABLE I

| Crank Station Angle | Crank radius — Inches | | | | | |
|---|---|---|---|---|---|---|
| | $n$ | | $2n$ | | $3n$ | |
| | H | E | H | E | H | E |
| 0 | 1.900 | 1.900 | 1.900 | — | 1.900 | — |
| 10 | 1.904 | 1.915 | 1.915 | — | 1.945 | — |
| 20 | 1.915 | 1.957 | 1.960 | — | 2.0771 | — |
| 40 | 1.960 | 2.096 | 2.134 | 2.506 | 2.534 | 2.807 |
| 60 | 2.034 | 2.266 | 2.400 | 2.703 | 2.900 | 2.9000 |
| 80 | 2.134 | 2.363 | 2.726 | 2.877 | 2.534 | 2.691 |
| 90 | 2.193 | 2.518 | 2.900 | 2.900 | 2.282 | 2.339 |
| 100 | 2.257 | 2.593 | 2.727 | 2.877 | 2.077 | 2.203 |
| 120 | 2.400 | 2.723 | 2.400 | 2.703 | 1.900 | 1.900 |
| 140 | 2.558 | 2.820 | 2.134 | 2.365 | 2.077 | 2.203 |
| 160 | 2.726 | 2.880 | 1.960 | — | 2.534 | 2.6912 |
| 180 | 2.900 | 2.900 | 1.900 | — | 2.900 | 2.900 |

It will be seen in Table 1 that the total stroke of the H–2$n$ system is only 3.8 while the standard unaugmented system would be 4.8 inches. The clearance volume of the H–2$n$ system is 7.36 inches$^3$ as compared to the 9.28 inches$^3$ of the standard system. Since there are less hot gases to contend with in the H–2$n$ system the expansion of these gases during the suction stroke, under real engine conditions would be less. Also the amount of fluid friction losses or throttling around the intake valve would be less. Both conditions would tend to improve the volumetric efficiency of this system over the standard system shown.

The relative piston travel corresponding to those crank radius values shown in Table I are presented in Table II together with values of the standard engine system which shows a normal crank radius of 2.4 inches for comparison.

TABLE II

| Crank Station Angle | Standard Engine | Piston Travel | | | | | |
|---|---|---|---|---|---|---|---|
| | | $n$ | | | $2n$ | $3n$ | |
| | | H | E | H | E | H | E |
| 0 | 0 | 0 | 0 | 0 | — | 0 | — |
| 10 | .048 | .050 | .011 | .042 | — | .034 | — |
| 20 | .183 | .173 | .013 | .283 | — | .156 | — |
| 40 | .696 | .651 | .140 | .693 | 0* | .519 | 0* |
| 60 | 1.440 | 1.355 | .538 | 1.406 | .432 | .784 | 1.02 |
| 80 | 2.295 | 2.167 | 1.252 | 2.222 | 1.657 | 1.270 | 2.245 |
| 90 | 2.720 | 2.576 | 1.727 | 2.348 | 2.348 | 1.698 | 2.667 |
| 100 | 3.130 | 2.969 | 2.229 | 2.365 | 2.978 | 2.134 | 2.928 |
| 120 | 3.840 | 3.673 | 3.237 | 2.918 | 3.666 | 2.992 | 2.992 |
| 140 | 4.370 | 4.220 | 4.077 | 3.392 | 4.051 | 3.754 | 3.338 |
| 160 | 4.690 | 4.600 | 4.207 | 3.695 | 3.942 | 4.420 | 4.339 |

From Table II it can be seen that the downward piston travel for the E–2$n$ and E–3$n$ systems does not occur until after the crank station angle of 40° is attained. This is caused by the augmentation cam which does not allow the piston to reach the top-dead-center position until an effective crank angle of 35°–51' and 41°–29' are achieved for each system respectively. This means that torque will be generated at the top-dead-center position at ignition for these systems which is not possible with standard crank systems. This condition becomes more pronounced as the augmentation factor is increased.

The approximate cylinder pressures corresponding to the piston travel of the various systems in Table II are presented in Table III.

TABLE III

| Crank Station | Standard | Cylinder Pressure — psia | | |
|---|---|---|---|---|
| | | $n$ | $2n$ | $3n$ |

| Angle | Engine | H | E | H | E | H | E |
|---|---|---|---|---|---|---|---|
| 0 | 957 | 957 | 957 | 957 | — | 957 | — |
| 10 | 850 | 845 | 935 | 885 | — | 895 | — |
| 20 | 696 | 705 | 890 | 605 | — | 725 | — |
| 40 | 398 | 420 | 740 | 385 | 957* | 472 | 957* |
| 60 | 230 | 245 | 465 | 213 | 525 | 370 | 307 |
| 80 | 152 | 160 | 260 | 136 | 202 | 268 | 155 |
| 90 | 139 | 135 | 195 | 132 | 149 | 197 | 130 |
| 100 | 110 | 112 | 152 | 130 | 117 | 162 | 118 |
| 120 | 89 | 92 | 106 | 104 | 93 | 116 | 115 |
| 140 | 77 | 80 | 85 | 87 | 85 | 91 | 103 |
| 160 | 70 | 72 | 81 | 80 | — | 76 | 77 |

The generally higher cylinder pressures of the augmented systems compared to those of the unaugmented standard engine system, as indicated in Table III, is caused by the upward movement of the cam mechanism during the initial downward movement of the crank which shortens the piston travel as shown in Table II.

The rotation of the cam mechanism about the crankpin causes the crank radius to change in a manner which produces an effective crank angle which is different than the crank station angles shown in the above tables. The adjusted effective crank angles necessary for the computation of crank torque is presented in Table IV.

TABLE IV

| crank station angle | standard engine | Effective Crank Angle — Degrees/Minutes | | | | | |
|---|---|---|---|---|---|---|---|
| | | n | | 2n | | 3n | |
| | | H | E | H | E | H | E |
| 0 | 0 | 0 | 0 | 0 | — | 0 | — |
| 10 | 10 | 11–38 | 6–44 | 13–17 | — | 15–3 | — |
| 20 | 20 | 23–17 | 13–52 | 26–17 | — | 29–49 | — |
| 40 | 40 | 46–17 | 29–51 | 50–44 | 35–51* | 51.13 | 41–29* |
| 60 | 60 | 68–51 | 48–08 | 71–58 | 51–02 | 60–0 | 60–0 |
| 80 | 80 | 90–44 | 67–59 | 88–29 | 76–44 | 68–47 | 89–10 |
| 90 | 90 | 101–23 | 78–39 | 90–0 | 90 | 78–05 | 102–01 |
| 100 | 100 | 111–49 | 89–24 | 91–31 | 103–1690–11 | 111–28 | |
| 120 | 120 | 131–58 | 111–26108–02 | 128–58 | 120–0 | 120–0 | |
| 140 | 140 | 150–59 | 134–01129–16 | 152–0149–47 | 128–30 | | |
| 160 | 160 | 168–29 | 156–56153–43 | 169–3071–13 | 150–50 | | |

The angle formed by the connecting rod and piston axial centerline corresponding to the effective crank angles values shown in Table IV are presented in Table V.

TABLE V

| crank station angle | standard engine | Connecting Rod Angle | | | | | |
|---|---|---|---|---|---|---|---|
| | | n | | 2n | | 3n | |
| | | H | E | H | E | H | E |
| 0 | 0 | 0 | 0 | 0 | — | 0 | — |
| 10 | 2–29 | 2–17 | 1–20 | 2–38 | — | 3–01 | — |
| 20 | 2–54 | 4–31 | 2–48 | 5–11 | — | 6–10 | — |
| 40 | 9–15 | 8–29 | 6–14 | 9–54 | 8–48* | 11–52 | 11–11* |
| 60 | 12–30 | 11–24 | 10–07 | 13–45 | 12–39 | 15–10 | 15–29 |
| 80 | 14–15 | 12–50 | 13–47 | 16–27 | 16–58 | 14–15 | 16–17 |
| 90 | 14–29 | 12–56 | 14–54 | 17–35 | 17–35 | 13–27 | 13–47 |
| 100 | 14–05 | 12–36 | 15–40 | 16–29 | 16–58 | 12–30 | 12–20 |
| 120 | 12–30 | 10–43 | 15–19 | 13–45 | 12–39 | 9–52 | 9–52 |
| 140 | 9–15 | 7–26 | 12–12 | 9–54 | 6–38 | 6–15 | 10–20 |
| 160 | 2–54 | 3–16 | 6–45 | 5–11 | — | 2–10 | 7–51 |

The Crank torque calculated for each crank station angle using values from Tables I, III, IV and V are presented in Table VL.

TABLE VI

| crank station angle | standard engine | Crank Torque, Inch/Pounds | | | | | |
|---|---|---|---|---|---|---|---|
| | | n | | 2n | | 3n | |
| | | H | E | H | E | H | E |
| 0 | 0 | 0 | 0 | 0 | — | 0 | — |
| 10 | 7,027 | 4,862 | 3,156 | 5,843 | — | 6,791 | — |
| 20 | 8,866 | 7,935 | 6,282 | 7,820 | — | 11,179 | — |
| 40 | 9,208,539 | 11,541 | 9,129 | 21,400* | 13,689 | 28,300* | |
| 50 | 7,121 | — | 12,217 | 7,792 | 21,704 | 14,325 | 22,564 |
| 60 | 6,773 | 6,293 | 11,432 | 6,607 | 16,374 | 13,500 | 11,226 |
| 80 | 4,716 | 4,277 | 7,862 | 4,692 | 7,613 | 8,735 | 5,261 |
| 90 | 4,190 | 3,478 | 6,368 | 4,808 | 5,426 | 5,799 | 3,538 |
| 100 | 3,120 | 2,686 | 4,966 | 4,418 | 3,821 | 4,233 | 2,778 |
| 120 | 2,026 | 1,709 | 3,016 | 2,743 | 2,051 | 2,157 | 2,136 |
| 140 | 1,202 | 954 | 1,714 | 1,549 | 925 | 970 | 1,905 |
| 160 | 552 | 354 | 878 | 712 | — | 274 | 955 |

The torque values presented in Table VI were calculated using the following equation:

$$\text{Torque} = R\gamma \left[ \sin(r+\beta) \frac{p \times A}{\cos \beta} \right]$$

where:
T = Torque, inch - pounds
Rt = Crank radius (Table I)
P = Cylinder pressure (Table III)
A = Piston area 12.56 in.$^2$
$\beta$ = Rod angle (Table V)
$\gamma$ = Effective crank angle (Table IV) Since the initial top-dead-center positions of the E–2n and the E–3n systems do not occur at the 40° crank station angle the starting values of these systems shown in the above tables have been adjusted to reflect the approximate piston top-dead-center position and are therefore marked with an asterisk.

The values shown in Table I through VI are approximate and are to the best knowledge of the inventor correct within the normal range of slide rule accuracy. Pressure values presented in Table III were taken from a graphical plot of cylinder volume versus cylinder pressure for an isentropic expanding system and are thought to be accurate within the range of ± 5 psi. The values presented are used for illustrative purpose only in order to describe the unique and beneficial effects of the system. Actual point design will adhere to more rigorous methods of analysis but will not significantly change the values within scope of the illustrative example presented.

The generally higher torque values of the augmented systems shown in Table VI reflect the beneficial combinations of, longer crank radius, higher corresponding cylinder pressures, more effective combinations of connecting rod and effective crank angles, which develope higher tangential force vectors at the crankpin.

What is claimed is:

1. In engines of the character described,
   a. An engine block,
   b. A plurality of equally spaced and axially aligned main journal bearings affixed to said engine block,
   c. a plurality of stationary gears centrally positioned over the axial center-line of said main journal bearings and being affixed to said engine block,
   d. a crankshaft rotatably mounted in said main journal bearings, e. said crankshaft having a plurality of shafts and a plurality of arms fixed at the (end) ends of said shafts,
f. said arms being radially aligned in respective pairs and each said pair affixed in this position by a (common) pin, said pin being firmly affixed to each said arm, in a respective pair,
g. an eccentric rotatably mounted on each said pin,
h. a connecting rod rotatably mounted upon each said eccentric said connecting rod being connected to a piston at its opposite end,
i. a non-circular gear attached to each said eccentric,
j. each said non-circular gear being enmeshed with (its) a duplicate non-circular gear,
k. each said duplicate non-circular gear being rotated by a fixedly attached connecting shaft rotatably mounted on an extension protruding from the edge of one of the said arms comprising each of the said pair of radially aligned arms,
l. the opposite end of each said connecting shaft being fixedly attached to and rotated by a running gear enmeshed in one of said stationary (gear) gears,
m. each said enmeshed running (gear) gears being caused to turn by the revolution of said crankshaft,
n. said rotation causing each said eccentric to be rotated in the opposite clockwise direction as the rotation of said crankshaft.

2. In engines of the character described,
a. an engine block,
b. a plurality of equally spaced and axially aligned main journal bearings affixed to said engine block,
c. a plurality of stationary internal tooth annular gears centrally positioned over the axial center line of said main journals and fixedly attached to said engine block at a point approximately one third the distance of the working span between said main journal bearings,
d. a crankshaft rotatably mounted in said main journal bearings,
e. said crankshaft having a plurality of shafts and a plurality of arms fixed at the (end) ends of said shafts,
f. said arms being radially aligned in respective pairs and each said pair affixed in this position by a (common) pin, said pin being fixedly attached to each said arm in a respective pair, one arm of each said radially aligned pair of arms (contain) containing an instep to accommodate clearance of said stationary internal tooth annular gears,
g. an eccentric rotatably mounted on each said pin,
h. a connecting rod rotatably mounted upon each said eccentric, each said connecting rod being connected to a piston at its opposite end,
i. a non-circular gear attached to each said eccentric, each said non-circular gear enmeshed with a duplicate non-circular gear,
j. each said duplicate non-circular gear being rotated by a fixedly attached connecting shaft each said shaft being rotatably mounted on the said arm of each said radially aligned pair of arms containing said instep,
k. the opposite end of each said connecting shaft being fixedly attached to and rotated by a running gear enmeshed in a respective said stationary internal tooth (gears) gear,
l. each said enmeshed running gear being caused to turn by the revolution of said crankshaft,
m. said revolution causing each said eccentric to be rotated in the same clockwise direction as the revolution of said crankshaft.

* * * * *